(12) United States Patent
Mori

(10) Patent No.: US 8,634,114 B2
(45) Date of Patent: Jan. 21, 2014

(54) IMAGE PROCESSING APPARATUS, IMAGE PROCESSING METHOD AND IMAGE SCANNING APPARATUS

(75) Inventor: Kosuke Mori, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 87 days.

(21) Appl. No.: 13/240,633

(22) Filed: Sep. 22, 2011

(65) Prior Publication Data

US 2012/0081766 A1 Apr. 5, 2012

(30) Foreign Application Priority Data

Sep. 30, 2010 (JP) ................................. 2010-221072

(51) Int. Cl.
*H04N 1/04* (2006.01)

(52) U.S. Cl.
USPC ........... 358/474; 358/505; 358/448; 358/515; 382/254

(58) Field of Classification Search
USPC ......... 358/474, 488, 448, 475, 509, 501, 505, 358/515, 516, 517, 1.9, 538, 540, 504; 382/375, 167, 162, 170, 254
See application file for complete search history.

(56) References Cited

U.S. PATENT DOCUMENTS

| | | | |
|---|---|---|---|
| 5,287,204 A | | 2/1994 | Koizumi et al. |
| 5,294,783 A | * | 3/1994 | Hammond et al. ...... 235/462.16 |
| 5,786,906 A | * | 7/1998 | Shishizuka ................... 358/500 |
| 7,072,506 B1 | * | 7/2006 | Hirota et al. .................. 382/162 |
| 7,177,462 B2 | * | 2/2007 | Hirota et al. .................. 382/162 |
| 7,319,786 B2 | * | 1/2008 | Hirota et al. .................. 382/162 |
| 7,385,737 B2 | * | 6/2008 | Zaima ........................... 358/504 |
| 7,583,906 B2 | * | 9/2009 | Bessho ........................... 399/30 |

(Continued)

FOREIGN PATENT DOCUMENTS

| | | |
|---|---|---|
| JP | 4-90676 | 3/1992 |
| JP | 4-336876 | 11/1992 |

(Continued)

OTHER PUBLICATIONS

Notification of Reason for Refusal dated Jan. 15, 2013 received from the Japanese Patent Office from related Japanese Application No. 2010-290493 and U.S. Appl. No. 13/328,639, together with an English-language translation.

(Continued)

*Primary Examiner* — Negussie Worku
(74) *Attorney, Agent, or Firm* — Scully, Scott, Murphy & Presser, P.C.

(57) ABSTRACT

An image processing apparatus including: a determining unit that performs determination so as to determine a color mode of a target image in a color mode order, in a page unit; and a subtracting unit that calculates a subtraction total number of pixels, wherein, the determining unit performs the determination of a first color mode in the color mode order based on a pixel ratio of a number of pixels of the first color mode in the color mode order to a total number of pixels, and the determining unit performs the determination of the second or subsequent color mode in the color mode order based on a pixel ratio of a number of pixels of the second or subsequent color mode in the color mode order to the subtraction total number of pixels calculated by the subtracting unit.

10 Claims, 10 Drawing Sheets

(56) References Cited

U.S. PATENT DOCUMENTS

| | | | |
|---|---|---|---|
| 7,620,239 B2 * | 11/2009 | Minamino | 382/165 |
| 7,680,425 B2 * | 3/2010 | Hama et al. | 399/49 |
| 7,813,846 B2 * | 10/2010 | Wills et al. | 701/19 |
| 7,821,526 B2 * | 10/2010 | Nagata et al. | 347/131 |
| 7,920,200 B2 * | 4/2011 | Azuma | 348/335 |
| 8,258,640 B2 * | 9/2012 | Conway et al. | 290/40 A |
| 8,521,045 B2 * | 8/2013 | Inada et al. | 399/46 |
| 2002/0131641 A1 | 9/2002 | Luo et al. | |
| 2004/0005076 A1 | 1/2004 | Hosaka et al. | |
| 2008/0187214 A1 | 8/2008 | Shoda | |
| 2008/0209549 A1 | 8/2008 | Ishigaki | |
| 2008/0270361 A1 | 10/2008 | Meyer et al. | |

FOREIGN PATENT DOCUMENTS

| | | |
|---|---|---|
| JP | 2002-312385 A | 10/2002 |
| JP | 2004-200779 A | 7/2004 |
| JP | A-2006-244174 | 9/2006 |
| JP | 2007-28164 | 2/2007 |
| JP | 2007-251740 | 9/2007 |
| JP | 2008-193680 | 8/2008 |
| JP | 2008-197796 A | 8/2008 |
| JP | 2008-210237 A | 9/2008 |
| JP | 2009-94596 A | 4/2009 |
| JP | 2009-094597 A | 4/2009 |
| JP | 2009-094598 A | 4/2009 |
| JP | 2010-130500 A | 6/2010 |

OTHER PUBLICATIONS

U.S. Appl. No. 13/328,639, to Nagai, dated Dec. 16, 2011.

Japanese Official Action dated Aug. 6, 2013 received in related application JP 2010-290493.

United States Official Action dated Oct. 10, 2013 received in related U.S. Appl. No. 13/328,639.

* cited by examiner

FIG. 5

| PIXEL | PIXEL THRESHOLD VALUE |
|---|---|
| BACKGROUND COLOR PIXEL | 240 |
| COLOR PIXEL | 10 |
| BLACK PIXEL | 50 |

FIG. 6

| PAGE | PAGE THRESHOLD VALUE |
|---|---|
| BLANK PAGE | 98% |
| COLOR PAGE | 2% |
| GRAY PAGE | 5% |

NUMBER OF BACKGROUND COLOR PIXELS: 70000
NUMBER OF COLOR PIXELS: 15000
NUMBER OF GRAY PIXELS: 5000
NUMBER OF BLACK PIXELS: 10000
TOTAL NUMBER OF PIXELS: 100000

NUMBER OF BACKGROUND COLOR PIXELS: 97000
NUMBER OF COLOR PIXELS: 1500
NUMBER OF GRAY PIXELS: 500
NUMBER OF BLACK PIXELS: 1000
TOTAL NUMBER OF PIXELS: 100000

FIG. 11

| PIXEL | NUMBER OF PIXELS | PIXEL RATIO | |
|---|---|---|---|
| BACKGROUND COLOR PIXEL | 70000 | 70% | (70000 / 100000) |
| COLOR PIXEL | 15000 | 50% | (15000 / 30000) |
| GRAY PIXEL | 5000 | 16.7% | (5000 / 15000) |
| BLACK PIXEL | 10000 | 33.3% | (10000 / 15000) |

PAGE DETERMINATION: COLOR PAGE

FIG. 12

| PIXEL | NUMBER OF PIXELS | PIXEL RATIO | |
|---|---|---|---|
| BACKGROUND COLOR PIXEL | 97000 | 97% | (97000 / 100000) |
| COLOR PIXEL | 1500 | 50% | (1500 / 3000) |
| GRAY PIXEL | 500 | 16.7% | (500 / 1500) |
| BLACK PIXEL | 1000 | 33.3% | (1000 / 1500) |

PAGE DETERMINATION: COLOR PAGE

US 8,634,114 B2

IMAGE PROCESSING APPARATUS, IMAGE PROCESSING METHOD AND IMAGE SCANNING APPARATUS

CROSS-REFERENCE TO RELATED APPLICATIONS

This application claims priority from Japanese Patent Application No. 2010-221072 filed on Sep. 30, 2010, the entire contents of which are incorporated herein by reference.

TECHNICAL FIELD

Aspects of the present invention relate to an image processing apparatus, an image processing method and an image scanning apparatus, which determine a color mode of a target image.

BACKGROUND

A variety of technologies for determining a color mode of a target image have been suggested.

For example, an image processing apparatus disclosed in JP-A-2007-251740 converts image data, which is input in a page unit from an image scanning unit and is resolved into three colors of R, G and B, into bitmap data of four colors of yellow (Y), cyan (C), magenta (M) and black (K). Subsequently, the apparatus counts a number of color pixels of a whole page for each color and compares the counted number of color pixels with a threshold value. When at least one of the numbers of the color pixels for the three colors is larger than the threshold value, the apparatus determines that the image data is a color image. Meanwhile, when all of the number of color pixels is the threshold value or smaller, the apparatus determines that the image data is a black-and-white image.

However, according to the image processing apparatus disclosed in JP-A-2007-251740, the determination result is influenced by a ratio of the number of color pixels to a total number of pixels of a whole page. Therefore, even when the image data is a color image, the image data may be determined as a black-and-white image.

For example, as shown in FIG. 10, a pixel ratio of the number of color pixels 15000 to the total number of pixels 100000 of a whole page is 15% in an upper color image 100. When the threshold value for identifying a color mode is 2% or larger of the total number of pixels, the pixel ratio 15% is larger than the threshold value 2%. Accordingly, the upper color image 100 is determined as a color image. Meanwhile, in a lower color image 101 obtained by reducing the upper color image 100, a pixel ratio of the number of color pixels 1500 to the total number of pixels 100000 of a whole page is 1.5%. Accordingly, when the threshold value for identifying a color mode is 2% of the total number of pixels, the lower color image 101 is not determined as a color image, but is determined as a black-and-white image.

SUMMARY

Accordingly, aspects of the present invention provide an image processing apparatus, an image processing method and an image scanning apparatus, capable of securely determining a color mode of a target image without being influenced by a ratio of the number of color pixels to the total number of pixels of a whole page.

According to an aspect of the present invention, there is provided an image processing apparatus including an identifying unit, a counting unit, an acquiring unit, a determining unit, and a subtracting unit. The identifying unit identifies a color mode of each pixel included in image data, based on color data of each pixel included in the image data. The counting unit counts a number of pixels included in the image data for each color mode of each pixel identified by the identifying unit in a page unit. The acquiring unit acquires a total number of pixels included in the image data in a page unit. The determining unit performs determination so as to determine a color mode of a target image in a color mode order, in a page unit. The subtracting unit calculates a subtraction total number of pixels obtained by subtracting a summed number of pixels, which is obtained by summing the number of pixels of each color mode before a second or subsequent color mode in the color mode order, from the total number of pixels acquired by the acquiring unit, before a determination to the second or subsequent color mode in the color mode order is performed by the determining unit. The determining unit performs the determination of a first color mode in the color mode order based on a pixel ratio of a number of pixels of the first color mode in the color mode order to the total number of pixels, and the determining unit performs the determination of the second or subsequent color mode in the color mode order based on a pixel ratio of a number of pixels of the second or subsequent color mode in the color mode order to the subtraction total number of pixels calculated by the subtracting unit.

According to another aspect of the present invention, there is provided an image processing method including: identifying a color mode of each pixel included in image data, based on color data of each pixel included in the image data; counting a number of pixels included in the image data for each color mode of each pixel identified by the identifying unit in a page unit; acquiring a total number of pixels included in the image data in a page unit; performing determination so as to determine a color mode of a target image in a color mode order, in a page unit; and calculating a subtraction total number of pixels obtained by subtracting a summed number of pixels, which is obtained by summing the number of pixels of each color mode before a second or subsequent color mode in the color mode order, from the total number of pixels acquired by the acquiring unit, before a determination to the second or subsequent color mode in the color mode order is performed by the determining unit, wherein, the determination of a first color mode in the color mode order is performed based on a pixel ratio of a number of pixels of the first color mode in the color mode order to the total number of pixels, and the determination of the second or subsequent color mode in the color mode order is performed based on a pixel ratio of a number of pixels of the second or subsequent color mode in the color mode order to the subtraction total number of pixels calculated by the subtracting unit.

According to another aspect of the present invention, there is provided an image processing apparatus including an identifying unit, a counting unit, an acquiring unit, a first determining unit, a subtracting unit and a second determining unit. The identifying unit identifies a color mode, which includes a first color mode and a second color mode, of each pixel included in image data, based on color data of each pixel included in the image data. The counting unit counts a number of pixels included in the image data for each color mode identified by the identifying unit so as to obtain a total number of pixels for each color mode, in a page unit. The acquiring unit acquires a total number of pixels included in the image data in a page unit. The first determining unit performs determination by comparing a pixel ratio of a total number of pixels of the first color mode to the total number of pixels acquired by the acquiring unit with a first threshold value. The subtracting unit calculates a subtraction total number of pixels obtained by subtracting the total number of pixels of the first color mode from the total number of pixels acquired by the acquiring unit. The second determining unit performs determination by comparing a pixel ratio of a total number of pixels of the second color mode to the subtraction total number of pixels with a second threshold value.

BRIEF DESCRIPTION OF DRAWINGS

FIG. 5 is a view showing an example of an image threshold value table that is stored in a FLASH-ROM;

FIG. 6 is a view showing an example of a page threshold value table that is stored in the FLASH-ROM;

FIG. 11 shows a determination result of a sheet on which an upper color photograph of FIG. 10 is printed; and FIG. 12 shows a determination result of a sheet on which a lower color photograph of FIG. 10 is printed.

SUMMARY

Hereinafter, illustrative embodiments implementing an image processing apparatus, an image processing method and an image scanning apparatus of the invention will be specifically described with reference to the drawings.

First, a schematic configuration of an image scanning apparatus 1 according to an illustrative embodiment is described with reference to FIGS. 1 to 3.

Figure 1:
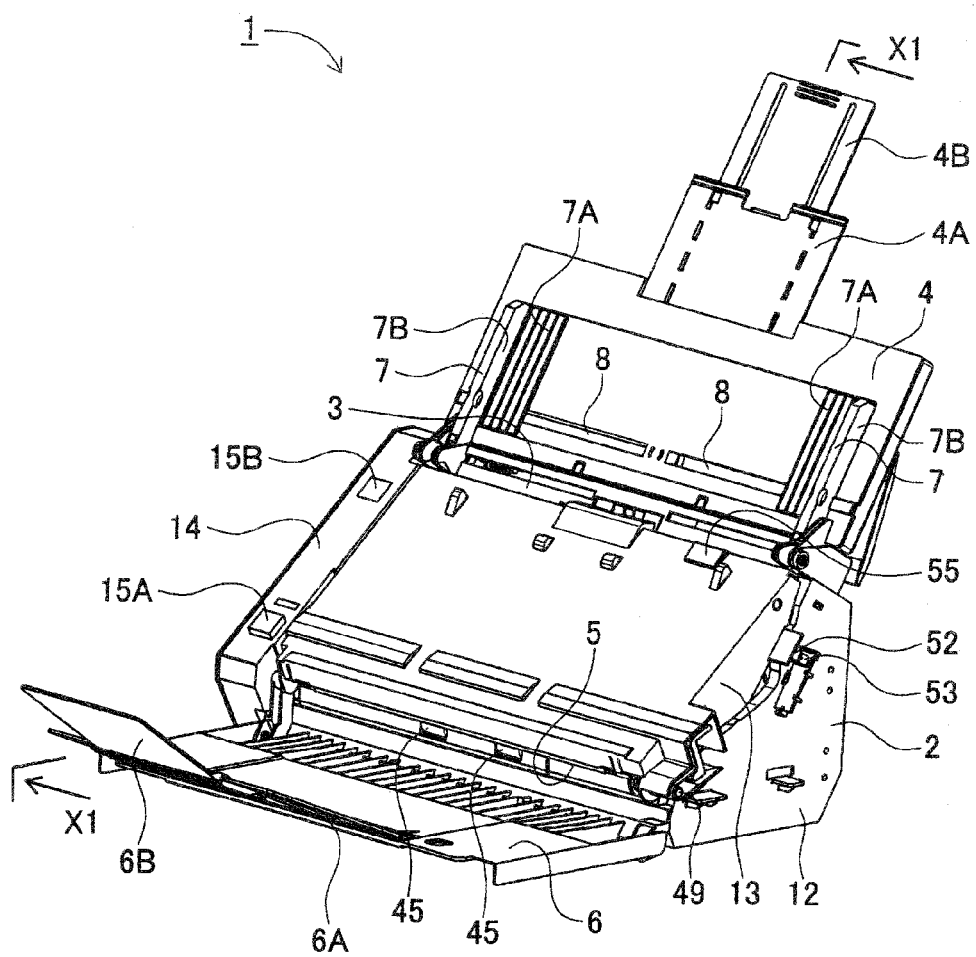
FIG. 1 is a perspective view showing an image scanning apparatus according to an illustrative embodiment of the invention.
Figure 2:
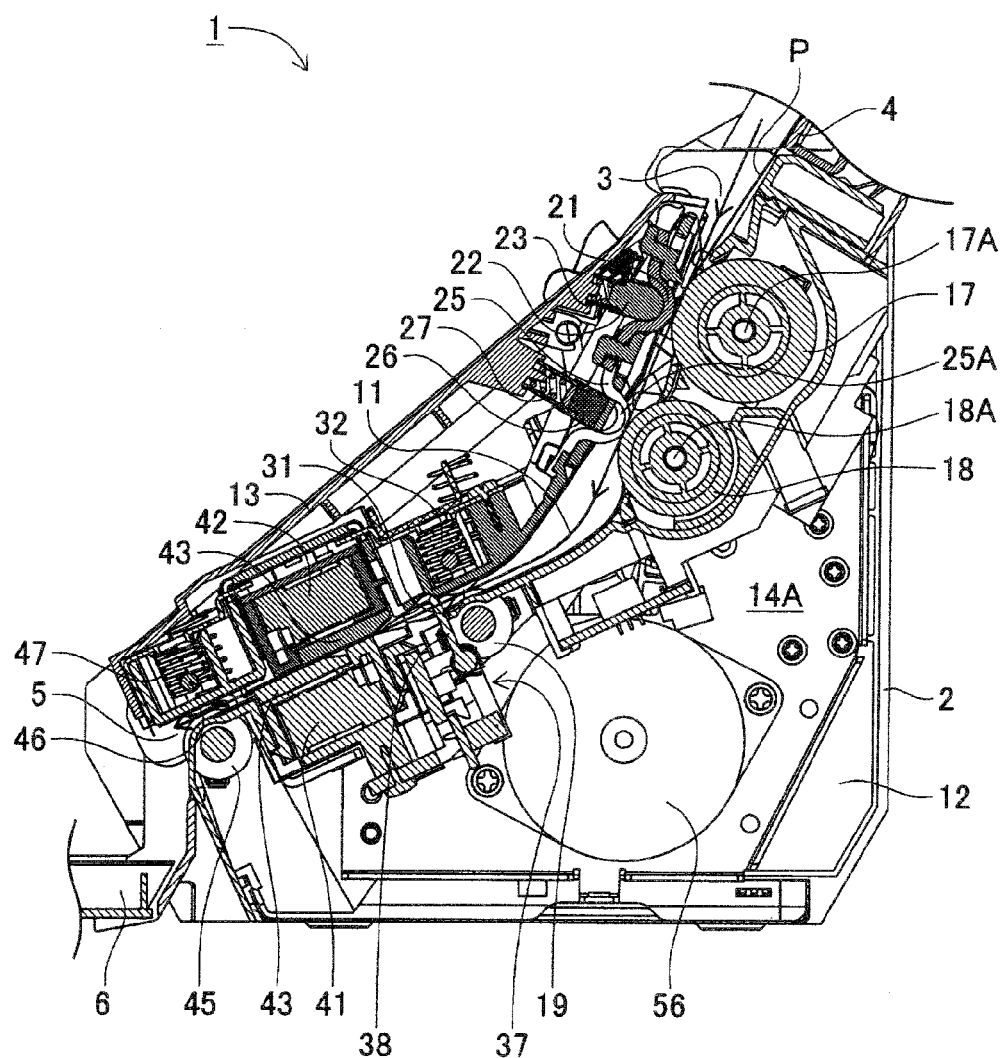
FIG. 2 is an overall sectional view, which is seen from an arrow direction of X1-X1 of FIG. 1.

As shown in FIGS. 1 and 2, the image scanning apparatus 1 has an apparatus body 2, a feeder port 3 that is provided at an upper part of the apparatus body 2, a feeder tray 4 that is disposed to be inclined at a substantially vertical angle above the feeder port 3, a discharge port 5 that is provided at a lower part of a front side of the apparatus body 2 and a discharge tray 6 on which a sheet P discharged from the discharge port 5 is stacked and that is arranged substantially horizontally.

The feeder tray 4 is provided with a pair of sheet guides 7 that restrains a position of the set sheet P in a width direction. Each sheet guide 7 has a cross-sectional shape of a substantial L shape and includes a plate 7A that can be slid while being supported by a pair of guide recesses 8 extending in a width direction of the feeder tray 4 and a sidewall 7B that stands from a side edge part of the plate 7A. In addition, the respective sheet guides 7 are configured so that when one sheet guide 7 is slid, the other sheet guide 7 is correspondingly slid in an opposite direction by an interlocking mechanism which is not shown.

In addition, auxiliary trays 4A, 4B, which are configured to be pulled out and stored in an upper and lower direction, are provided to an upper end portion of the feeder tray 4. The discharge tray 6 is provided to be rotatable toward the apparatus body 2 about a base end of the apparatus body 2 and thus to be able to closely contact an upper surface of the apparatus body 2. Also, the discharge tray 6 has auxiliary trays 6A, 6B at a side edge part thereof opposite to the apparatus body 2. As shown in FIG. 3, the respective auxiliary trays 6A, 6B are configured to be rotatable inwards to thus be stored so as to overlap the discharge tray 6.

The apparatus body 2 has a lower frame 12 that configures a conveyance path 11 from the feeder port 3 to the discharge port 5 of the sheet P and an upper frame 13 that covers an upper side of the lower frame 12 so as to be openable and closable. When seen from a front side of the lower frame 12, a left edge part is provided with a gear receiving unit 14 in which a gear train, which is not shown, is stored. A start switch 15A, an error lamp 15B and the like are arranged on an upper surface of the gear receiving unit 14.

Figure 3:
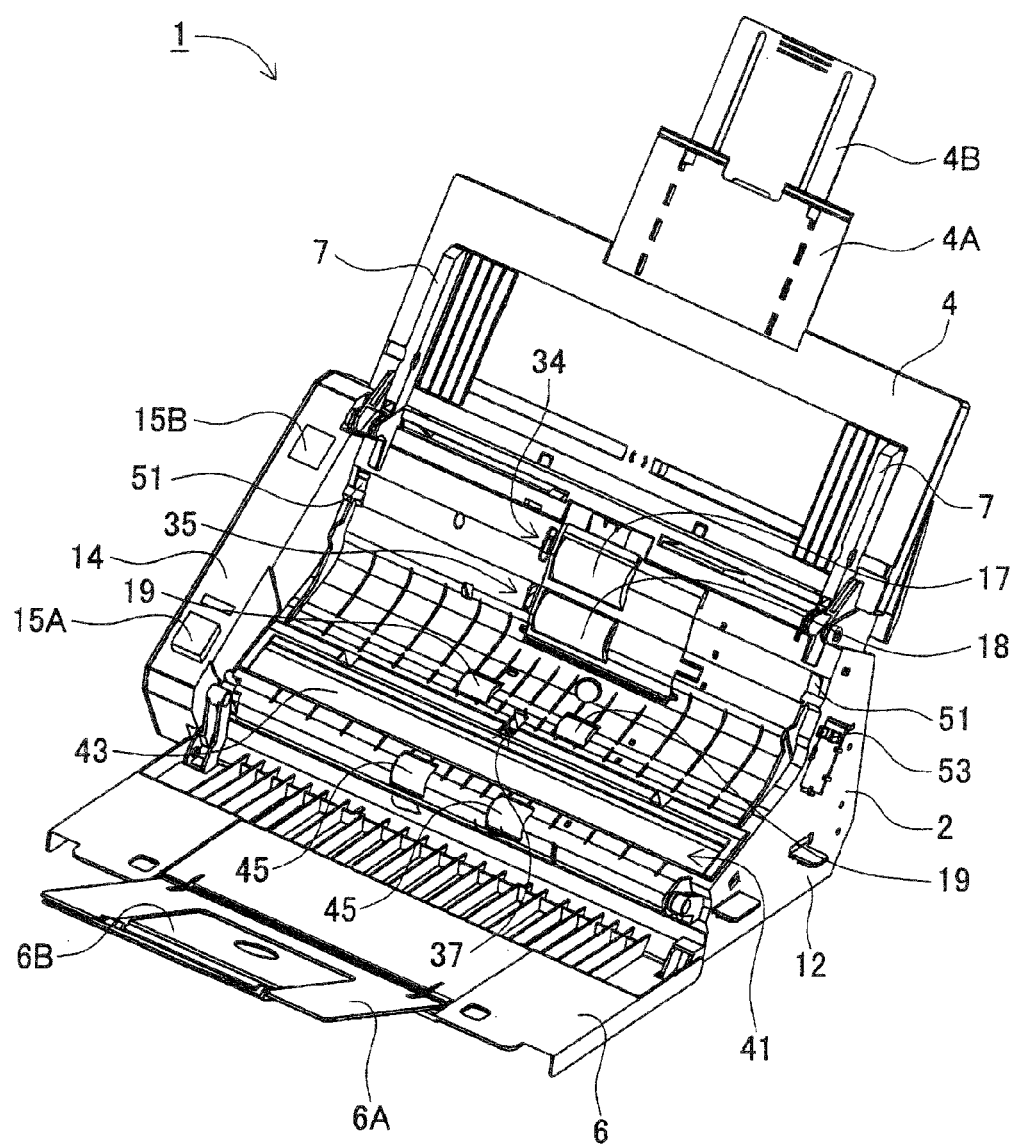
FIG. 3 is a perspective view showing a state in which an upper frame is removed.

As shown in FIGS. 2 and 3, the lower frame 12 is provided with a first conveyance roller 17 that is disposed adjacent to the feeder port 3 and separates and pulls the sheet P, which is set on the feeder tray 4, along the conveyance path 11. A second conveyance roller 18 that separates and pulls the sheet P along the conveyance path 11 is disposed downstream of the first conveyance roller 17 in a conveyance direction. A pair of third conveyance rollers 19 that is attached on a same shaft and conveys the sheet P along the conveyance path 11 is provided downstream of the second conveyance roller 18 in the conveyance direction.

A first separation member 21, which is made of a high frictional elastic member such as rubber and is brought into contact with an outer circumference of the first conveyance roller 17 when closing the upper frame, is provided at a position of the upper frame 13 opposing the first conveyance roller 17. When closing the upper frame 13, the first separation member 21 is elastically pressed by a pushing member 22 and a compression spring 23 which are arranged on a backside of the upper frame 13, so that it is pressed on the outer circumference of the first conveyance roller 17 with predetermined load.

In addition, a second separation member 25, which is made of a high frictional elastic member such as rubber and is brought into contact with an outer circumference of the second conveyance roller 18 when closing the upper frame, is provided at a position of the upper frame 13 opposing the second conveyance roller 18.

When closing the upper frame 13, the second separation member 25 is elastically pressed by a pushing member 26, which has a leading end portion having a rectangular cross section, and a compression spring 27 which are arranged on a backside of the upper frame 13 so that the second separation member 25 is pressed on the outer circumference of both axial ends of the second conveyance roller 18 with predetermined load.

In addition, a pair of pinch rollers 31 is rotatably provided at positions of the upper frame 13 opposing the pair of third conveyance rollers 19. The pinch rollers 31 have shafts that are elastically pressed toward the third conveyance rollers 19 by compression springs 32. Accordingly, the respective pinch rollers 31 are pressure-contacted to the outer circumferences of the third conveyance rollers 19, and when the third conveyance rollers 19 are respectively rotated, the respective pinch rollers 31 are correspondingly rotated.

Regarding the sheets P that are fed to the feeder tray 4 and guided to a nip portion between the first conveyance roller 17 and the first separation member 21, the lowest sheet P, i.e., the sheet P contacting the outer circumference of the first conveyance roller 17 is separated due to the friction with the first separation member 21 by the rotation of a shaft 17A of the first conveyance roller 17 and is then conveyed to the second conveyance roller 18.

Subsequently, regarding the sheet P conveyed to a nip portion between the second conveyance roller 18 and each contact part 25A of the second separation member 25, the sheet P contacting the outer circumference of the second conveyance roller 18 is separated by the friction with each contact part 25A and is then conveyed to the pair of third conveyance rollers 19 disposed downstream in the conveyance direction.

As shown in FIG. 3, a first sheet sensor 34 detecting the sheet P is provided at a position adjacent to a left side of the first conveyance roller 17 when seen from the front side. A second sheet sensor 35 detecting the sheet P is provided at a position adjacent to a left side of the second conveyance roller 18 when seen from the front side. When the first sheet sensor 34 detects the sheet P conveyed to the nip portion between the first conveyance roller 17 and the first separation member 21, the first sheet sensor outputs an ON signal. When the sheet P is not detected, the first sheet sensor outputs an OFF signal. Likewise, when the second sheet sensor 35 detects the sheet P conveyed to the nip portion between the second conveyance roller 18 and each contact part 25A of the second separation member 25, the second sheet sensor outputs an ON signal, and when the sheet P is not detected, the second sheet sensor outputs an OFF signal.

In addition, as shown in FIG. 3, a third sheet sensor 37 that detects a leading end portion of the sheet P having passed through the nip portions between the respective third conveyance rollers 19 and the respective pinch rollers 31 is provided at a substantially central position between the third conveyance rollers 19. As shown in FIG. 2, when a contact member 38 is rotated in a downstream direction in the conveyance direction by the sheet P having passed through the nip portions between the pair of third conveyance rollers 19 and the pair of pinch rollers 31, the third sheet sensor 37 outputs an ON signal. When the contact member 38 is not rotated by the sheet P, the third sheet sensor outputs an OFF signal.

As shown in FIGS. 2 and 3, the lower frame 12 is provided with a lower line sensor 41, which is configured by a so-called contact image sensor, at a downstream side of the third conveyance rollers 19 and the third sheet sensor 37 in the conveyance direction. The lower line sensor scans an image of a surface of the sheet P conveyed along the conveyance path 11.

In addition, the upper frame 13 is provided with an upper line sensor 42, which is configured by a contact image sensor, at a downstream side of the pinch rollers 31 in the conveyance direction so as to oppose to the lower line sensor 41. The upper line sensor scans an image of a backside of the sheet P conveyed along the conveyance path P.

The lower line sensor 41 and the upper line sensor 42 have the substantially same configuration. Each of the lower line sensor 41 and the upper line sensor 42 has a light source, a lens and a light receiving element, respectively. Also, each of the lower line sensor 41 and the upper line sensor 42 are provided with contact glasses 43, respectively, so as to oppose to the sheet P. The sheet P passes between the contact glasses 43 of the lower line sensor 41 and the upper line sensor 42 while closely contacting the contact glasses 43.

The respective line sensors 41, 42 illuminate lights from the light sources to the sheet P through the contact glasses 43, collect the lights reflected from the sheet P into the light receiving elements by the lenses, convert the lights into RGB signals corresponding to color data of an image and output the same. By performing image processing to the RGB signals, it is possible to obtain image data of both sides of the sheet P, which consists of RGB values of each pixel and the like, in a page unit.

The light receiving elements are arranged in a main scanning direction of the sheet P, which is a direction perpendicular to the conveyance path 11, in a chip unit, for example. In addition, the light sources and the lenses are arranged in the same direction as the light receiving elements. In addition, the respective contact glasses 43 extend in the main scanning direction in correspondence to a length of the main scanning direction of the lower line sensor 41 and the upper line sensor 42.

As shown in FIGS. 2 and 3, the lower frame 12 is provided with a pair of discharge rollers 45 at positions downstream from the conveyance direction of the lower line sensor 41, which are attached on a same shaft and discharge the sheet P from the discharge port 5 along the conveyance path 11. Also, the upper frame 13 is provided with a pair of pinch rollers 46 at positions opposed to the pair of discharge rollers 45.

The pinch rollers 46 have shafts that are elastically pressed toward the opposing discharge rollers 45 by compressing springs 47. Accordingly, the respective pinch rollers 46 are pressure-contacted on outer circumferences of the respective discharge rollers 45, so that when the respective discharge rollers 45 are rotated, the respective pinch rollers 46 are correspondingly rotated.

Here, as shown in FIGS. 1 to 3, the upper frame 13 is pivotably supported at both end portions of the discharge port 5 by a pair of shafts 49 protruding from both end portions of the side edge parts of the respective pinch rollers 46. By rotating the upper frame 13 to the lower frame 12 side and bringing the upper frame 13 into contact with the lower frame 12, elastic engaging pieces not shown, which are provided at both end portions of the side edge parts of the feeder port 3 of the upper frame 13, engages with respective engaging holes 51 provided at both side edge parts of the feeder port 3 of the lower frame 12.

When the upper frame 13 engages with the lower frame 12, a thin plate-shaped protruding piece 52, which protrudes from a right edge when seen from the front of the feeder port 3 of the upper frame 13, is received in a recess of a cover switch 53 configured by a recess-shaped photo micro sensor that is disposed at a right edge when seen from the front of the lower frame 12. Thereby, when the upper frame 13 engages with the lower frame 12 and the protruding piece 52 is thus received in the recess, the cover switch 53 outputs an ON signal. On the other hand, when the upper frame 13 is open, the cover switch outputs an OFF signal.

In addition, when an opening button 55 disposed on an inner side of the feeder port 3 of the upper frame 13 is pulled forward, the respective elastic engagement pieces, which are not shown, are rotated upward, so that the engagement pieces are disengaged from the respective engagement holes 51. Accordingly, when the sheet P is jammed on the conveyance path 11, or when each contact glass 43 is dirty, a user can easily solve the jamming problem or clean the respective contact glasses 43 by pulling the opening button 55 forward to open the upper frame 13 in the front direction.

Further, as shown in FIG. 2, a motor gear is attached to a motor shaft of a sheet conveyance motor 56, which is attached on a sidewall 14A of the gear receiving unit 14 and is configured to transfer the rotation driving to the first conveyance roller 17, the second conveyance roller 18, the third conveyance rollers 19 and the discharge rollers 45 through the gear train, which is not shown, received in the gear receiving unit 14.

Figure 4:
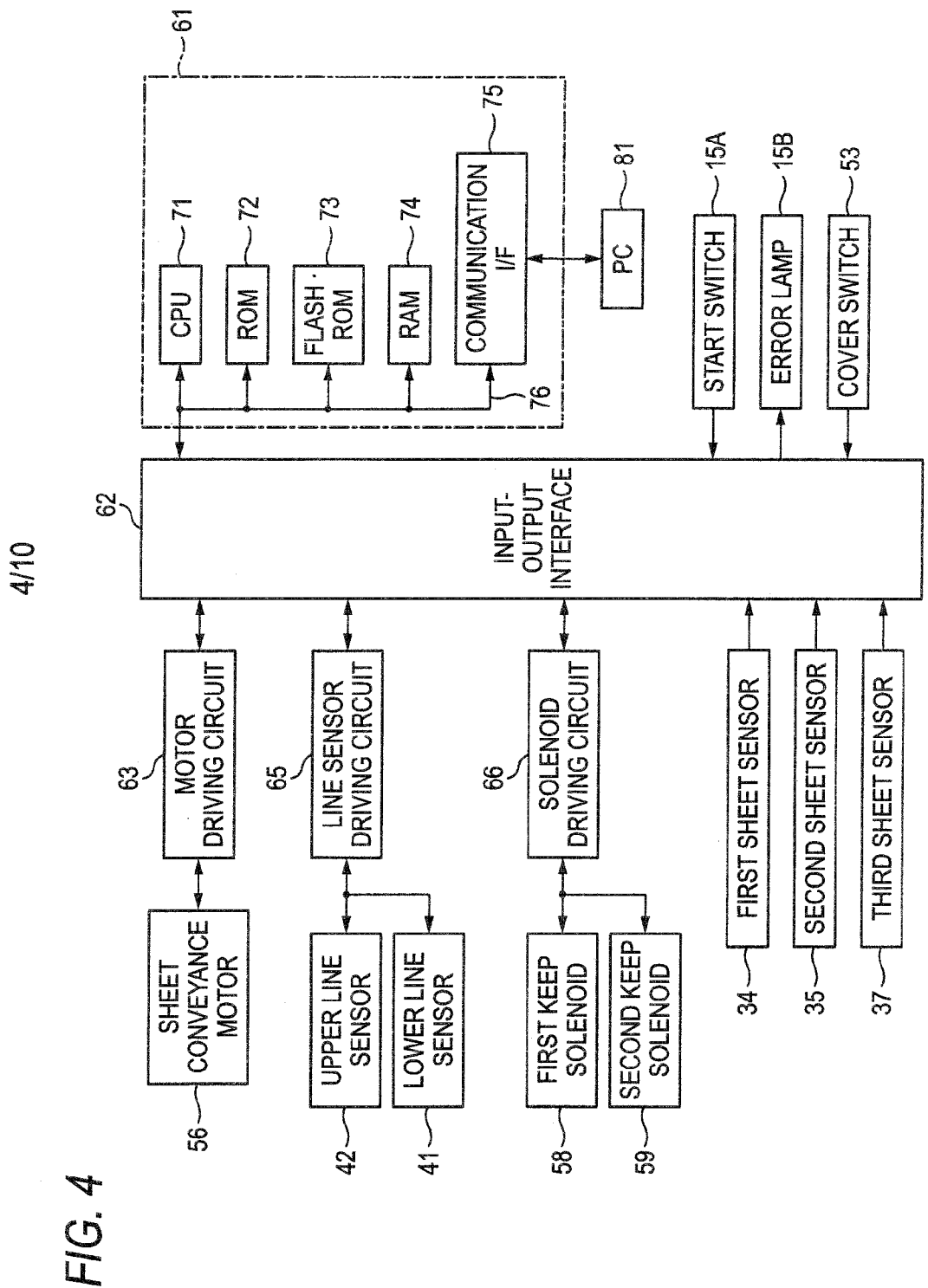
FIG. 4 is a circuit block diagram showing a circuit configuration of the image scanning apparatus.

As shown in FIG. 4, by driving a plunger of a first keep solenoid 58 received in the gear receiving unit 14 to a position at which it protrudes, the shaft 17A of the first conveyance roller 17 is rotated. Further, by driving the plunger of the first keep solenoid 58 to a position at which it is pulled, the rotating of the shaft 17A of the first conveyance roller 17 is stopped.

In addition, as shown in FIG. 4, by driving a plunger of a second keep solenoid 59 received in the gear receiving unit 14 to a position at which it protrudes, the shaft 18A of the second conveyance roller 18 is rotated. Further, by driving the plunger of the second keep solenoid 59 to a position at which it is pulled, the rotating of the shaft 18A of the second conveyance roller 18 is stopped.

Hereinafter, a circuit configuration of the image scanning apparatus 1 is described with reference to FIG. 4.

As shown in FIG. 4, the image scanning apparatus 1 has a control circuit unit 61 that controls the whole image scanning apparatus 1, an input-output interface 62 that is connected to the control circuit unit 61, and a motor driving circuit 63, a line sensor driving circuit 65, a solenoid driving circuit 66 and the like, which are connected to the input-output interface 62. In addition, the start switch 15A, the error lamp 15B, the first sheet sensor 34, the second sheet sensor 35, the third sheet sensor 37, the cover switch 53 and the like are connected to the input-output interface 62.

The control circuit unit 61 has a Central Processing Unit (CPU) 71, which is a calculation and control device for controlling the whole image scanning apparatus 1, a Read-Only Memory (ROM) 72, a flash ROM 73, a Random Access Memory (RAM) 74, a communication interface 75 and the like. In addition, the CPU 71, the ROM 72, the flash ROM 73, the RAM 74 and the communication interface 75 are connected to each other by a bus line 76 and transmit and receive data mutually.

The ROM 72 stores various parameters and programs necessary for controlling the image scanning apparatus 1. For example, the ROM 72 stores a variety of programs for a conveyance control process of conveying the sheet P. The flash ROM 73 stores a control program for preparing and outputting image data of images on the sheet P scanned by the lower line sensor 41 and the upper line sensor 42, and a variety of parameters.

The flash ROM 73 stores a pixel threshold value table 91 which is shown in FIG. 5. In the pixel threshold value table 91, pixel threshold values for identifying a color mode of each pixel are stored. In addition, the flash ROM 73 stores a page threshold value table 92 which is shown in FIG. 6. In the page threshold value table, page threshold values for determining a color mode of a target image in a page unit are stored. Also, the flash ROM 73 stores various programs, for example, a program for a color mode identifying process of identifying a color mode of a target image in a page unit, which is shown FIG. 7.

The CPU 71 performs various calculations and controls based on the parameters and programs stored in the ROM 72 and the flash ROM 73. The RAM 74 temporarily stores the various calculation results calculated by the CPU 71, the image data on the sheet P scanned by the lower line sensor 41 and the upper line sensor 42, and the like.

The sheet conveyance motor 56 is connected to the motor driving circuit 63. The motor driving circuit 63 drives the sheet conveyance motor 56 in response to an instruction from the CPU 71 of the control circuit unit 61. Also, the upper line sensor 42 and the lower line sensor 41 are connected to the line sensor driving circuit 65.

The line sensor driving circuit 65 performs a driving control such as adjustment of operating current for turning on the light sources of the upper line sensor 42 and the lower line sensor 41, converts the electric signals of the light receiving elements into the RGB signals and the like and outputs the same, in response to an instruction from the CPU 71 of the control circuit unit 61. In addition, the CPU 71 temporarily stores the image data, which is prepared on the basis of the RGB signals and the like received from the line sensor driving circuit 65, in the RAM 74 and outputs the same to an external PC 81 through the communication interface 75. In this illustrative embodiment, the RGB signals are converted into digital signals of 0 to 255, which is expressed by a binary number of 8 bits. White is expressed by 255 and black is expressed by 0.

The first keep solenoid 58 and the second keep solenoid 59 are connected to the solenoid driving circuit 66. The solenoid driving circuit 66 performs the driving control so that the respective plungers of the first keep solenoid 58 and the second keep solenoid 59 are located at the protruding or pulled-in positions, in response to an instruction from the CPU 71 of the control circuit unit 61. The CPU 71 of the control circuit unit 61 controls the driving of the respective keep solenoids 58, 59 through the solenoid driving circuit 66, based on the detection signals from the first sheet sensor 34, the second sheet sensor 35 and the third sheet sensor 37.

Here, an example of the pixel threshold value table 91 that is stored in the flash ROM 73 is described with reference to FIG. 5.

As shown in FIG. 5, the pixel threshold value table 91 has a pixel column and a pixel threshold value column. In the pixel column, color modes of pixels are stored. In the pixel threshold value column, threshold values for identifying color modes of pixels are stored correspondingly to the color modes of the respective pixels stored in the pixel column.

For example, 240, which indicates RGB values as a background color threshold value, is stored in the pixel threshold value for identifying a color mode of a pixel as background color pixel. In addition, 10, which indicates a brightness difference as a color threshold value, is stored in the pixel threshold value for identifying a color mode of a pixel as color pixel. Also, 50, which indicates RGB values as a black threshold value, is stored in the pixel threshold value for identifying a color mode of a pixel as black pixel.

Next, an example of the page threshold value table 92 that is stored in the flash ROM 73 is described with reference to FIG. 6.

As shown in FIG. 6, the page threshold value table 92 has a page column and a page threshold value column. In the page column, color modes of pages are stored. In the page threshold value column, threshold values for identifying color modes of pages are stored correspondingly to the color modes of the respective pages stored in the page column.

For example, 98%, which indicates a pixel ratio as a blank sheet threshold value, is stored in the page threshold value for identifying a color mode of a page as blank page. In addition, 2%, which indicates a pixel ratio as a color page threshold value, is stored in the page threshold value for identifying a color mode of a page as color page. Also, 5%, which indicates a pixel ratio as a gray page threshold value, is stored in the page threshold value for identifying a color mode of a page as gray page.

[Color Mode Identifying Process]

Figure 7:
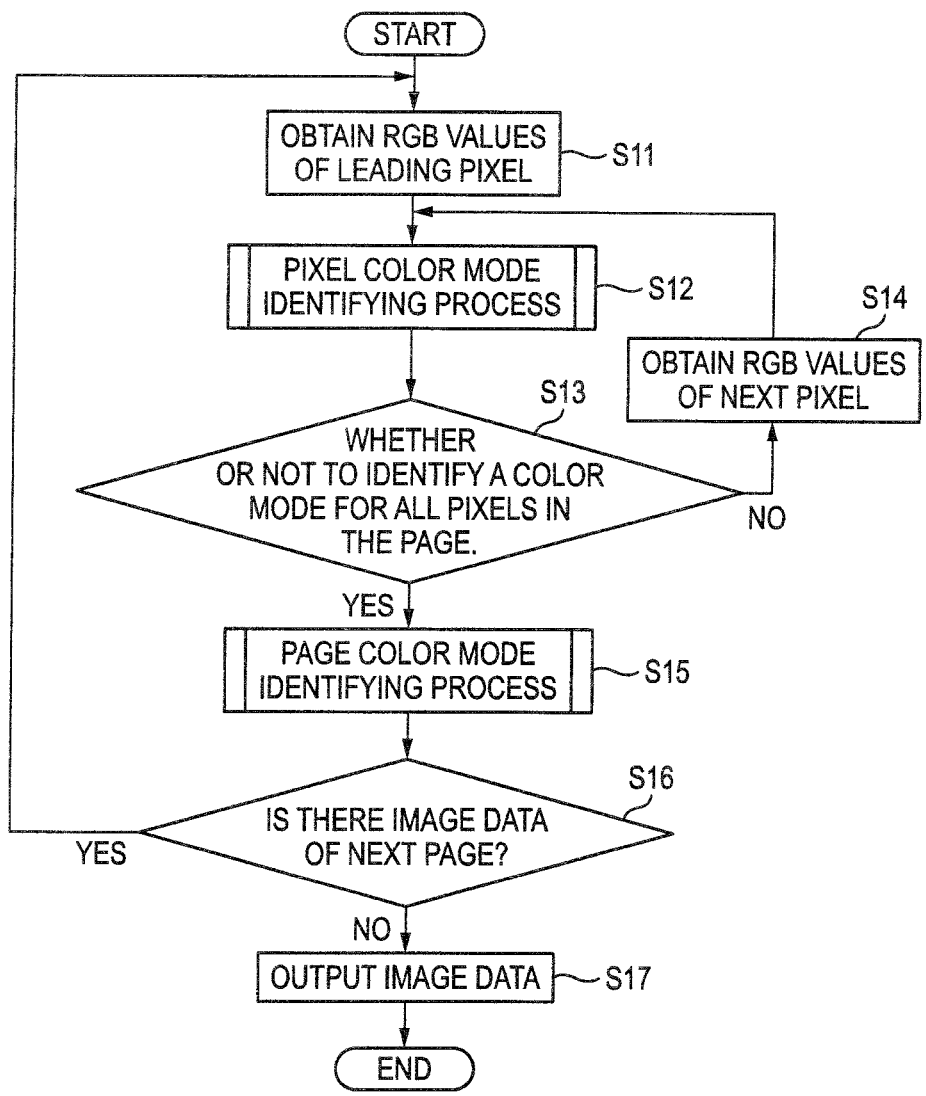
FIG. 7 is a flowchart showing a color mode identifying process of identifying a color mode of a target image in a page unit.
Figure 8:
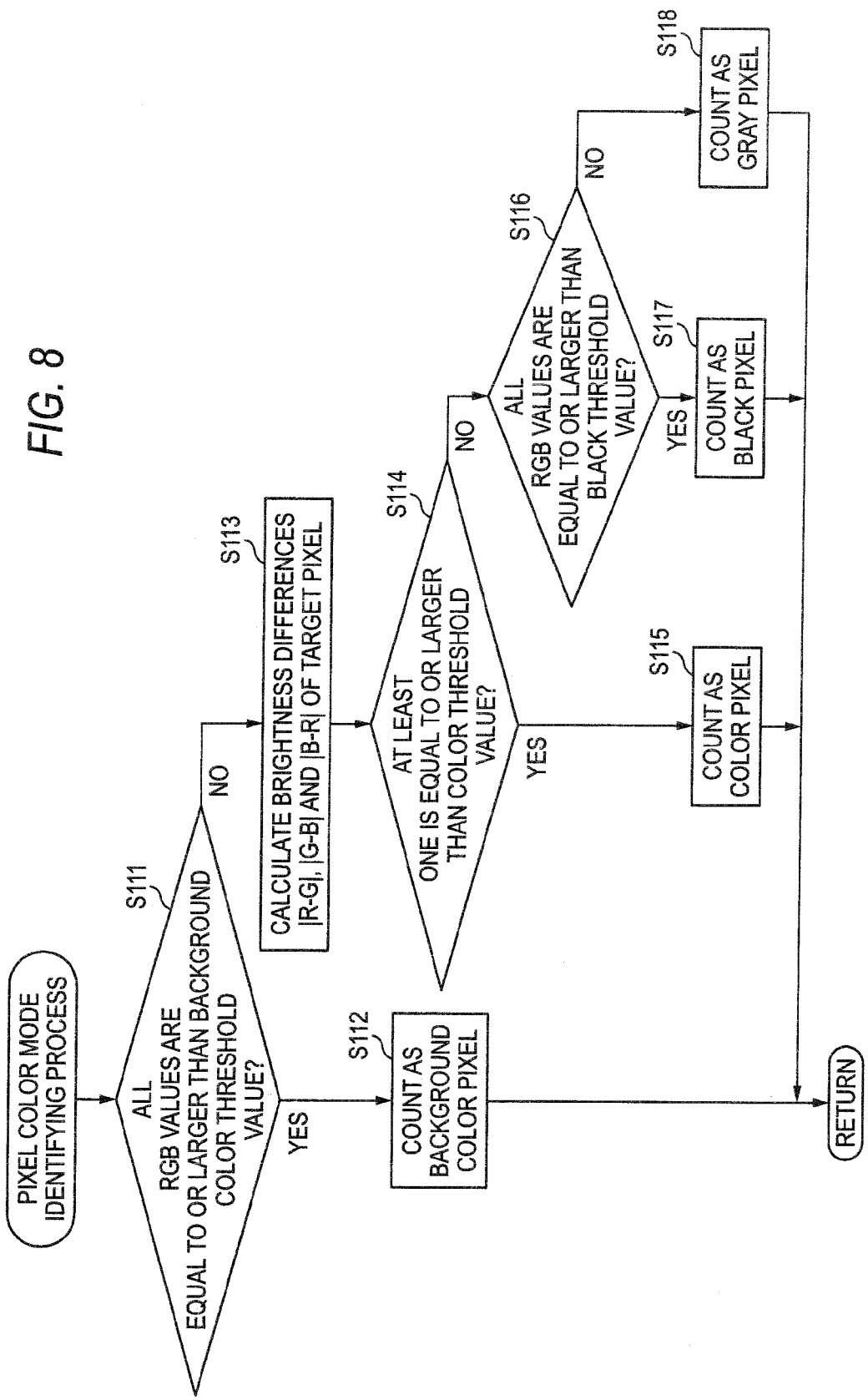
FIG. 8 is a sub-flowchart showing a sub-process of a pixel color mode identifying process of FIG. 7.
Figure 9:
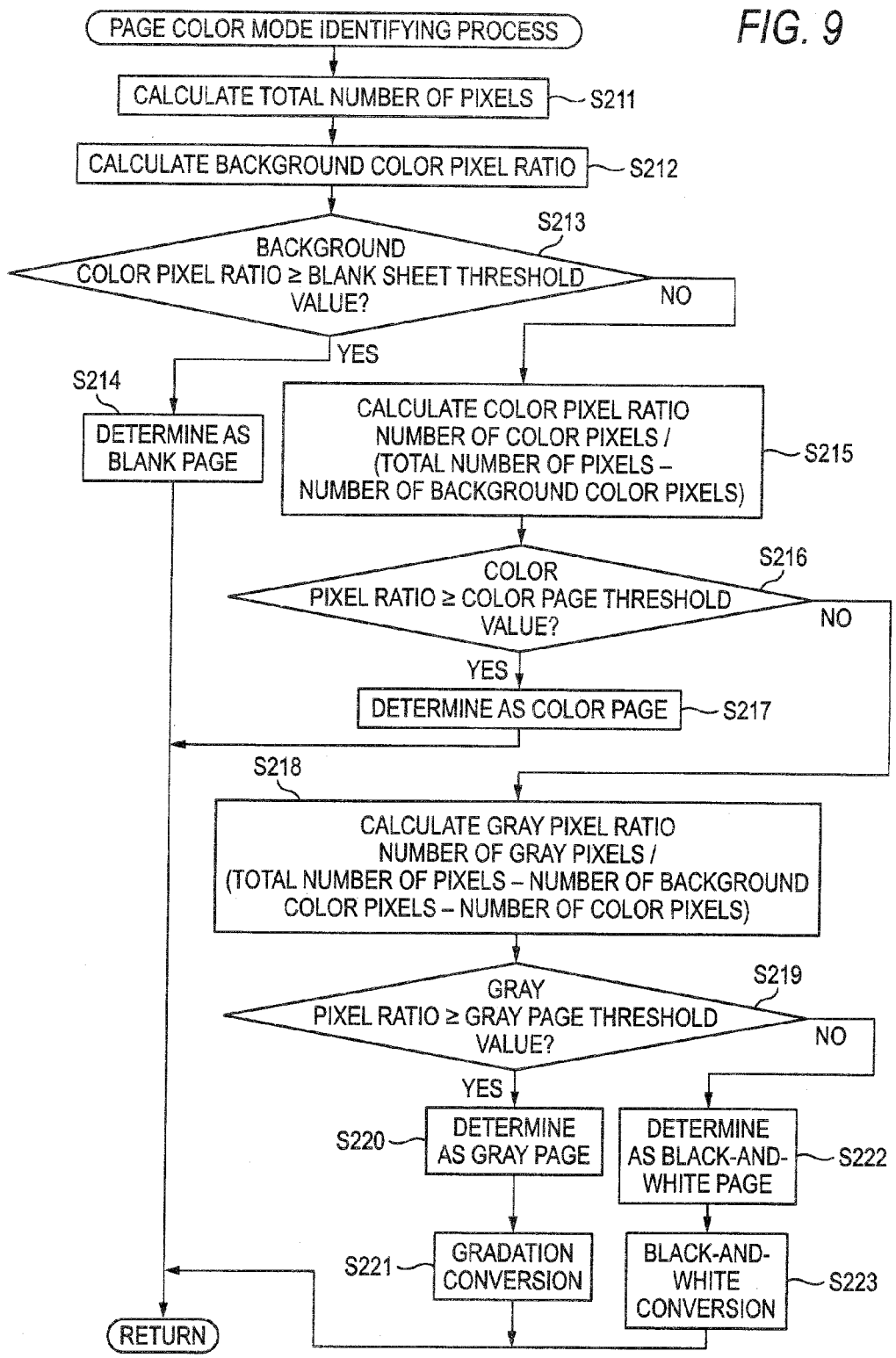
FIG. 9 is a sub-flowchart showing a sub-process of a page color mode identifying process of FIG. 7.

Hereinafter, a color mode identifying process of identifying a color mode of a target image in a page unit by the image scanning apparatus 1, which is configured as described above, is described with reference to FIGS. 7 to 12. The program that is shown with flowcharts of FIGS. 7 to 9 is stored in the flash ROM 73 and executed by the CPU 71. The image data of the sheet P, which is obtained by the lower line sensor 41 and the upper line sensor 42, is stored in a page unit in the RAM 74.

As shown in FIG. 7, in step (hereinafter, abbreviated to S) 11, the CPU 71 extracts the image data of a first page, which is stored in the RAM 74, into a working area of the RAM 74. Then, the CPU 71 reads out RGB values of a leading pixel of the image data extracted into the working area, i.e., RGB values of a first pixel on a first line and stores the same in the RAM 74, as RGB values of a target pixel.

In addition, the CPU 71 initializes a background color pixel counter that counts background color pixels, a color pixel counter that counts color pixels, a gray pixel counter that counts gray pixels and a black pixel counter that counts black pixels.

In S12, as described in FIG. 8, the CPU 71 executes a sub-process of a pixel color mode identifying process of identifying a color mode of a pixel and counting pixels for each color mode.

In S13, the CPU 71 determines whether RGB values of a next pixel in the page are stored in the RAM 74. That is, the CPU 71 determines whether or not a color mode for all pixels in the page has been identified. When it is determined that RGB values of a next pixel in the page are stored in the RAM 74 (S13: NO), the CPU 71 proceeds to S14. In S14, the CPU 71 reads out the RGB values of a next pixel in the page, stores the same in the RAM 74, as RGB values of a target pixel, and then re-executes the processes after S12.

On the other hand, when it is determined that RGB values of a next pixel in the page is not stored in the RAM 74, that is, when it is determined that a color mode has been identified for all pixels in the page (S13: YES), the CPU 71 proceeds to S15. In S15, as described in FIG. 9, the CPU 71 executes a sub-process of a page color mode identifying process of identifying a color mode of a target image on the page.

Then, in S16, the CPU 71 determines whether image data of a next page is stored in the RAM 74. When it is determined that image data of a next page is stored in the RAM 74 (S16: YES), the CPU 71 initializes the working area of the RAM 74, extracts the image data of a next page into the working area of the RAM 74 and re-executes the processes after S11.

On the other hand, when it is determined that image data of a next page is not stored in the RAM 74 (S16: NO), the CPU 71 determines that color modes of target images on all pages are identified and proceeds to S17. In S17, the CPU 71 outputs the image data of each page having header information indicating the color mode of the image and the like to the PC 81 and the like through the communication interface 75 and then ends the above process.

[Pixel Color Mode Identifying Process]

Hereinafter, a sub-process of the pixel color mode identifying process that is executed by the CPU 71 in S12 is described with reference to FIG. 8.

As shown in FIG. 8, in S111, the CPU 71 reads out the background color threshold value, which is a threshold value for identifying a color mode of a pixel as background color pixel, from the pixel threshold value table 91 that is stored in the flash ROM 73. Then, the CPU 71 reads out the RGB values of a target pixel, which are stored in the RAM 74 in S11 or S14, and determines whether all values of R, G and B are equal to or larger than a background color threshold value.

For example, as shown in FIG. 5, when the background color threshold value, which is a threshold value for identifying a color mode of a pixel as background color pixel, is 240, the CPU 71 reads out the RGB values of a target pixel, which are stored in the RAM 74 in S11 or S14, to determine whether all values of R, G and B are 240 or larger.

When it is determined that all values of R, G and B of the target pixel are 240 or larger (S111: YES), the CPU 71 proceeds to S112. In S112, the CPU 71 determines that a color mode of the pixel is a background color pixel mode indicating a pixel of a background color. The CPU 71 counts the pixel as a background color pixel, i.e., adds 1 to the background color pixel counter. The CPU 71 ends the above sub-process and returns to S13 of the main flowchart.

On the other hand, when it is determined that at least one value of R, G and B of the target pixel is below the background color threshold value (S111: NO), the CPU 71 proceeds to S113. In S113, the CPU 71 reads out the RGB values of the target pixel and calculates brightness differences |R−G|, |G−B| and |B−R|.

Subsequently, in S114, the CPU 71 reads out the color threshold value, which is a threshold value for identifying a color mode of a pixel as color pixel, from the pixel threshold value table 91 that is stored in the flash ROM 73. Then, the CPU 71 determines whether at least one of the calculated brightness differences |R−G|, |G−B| and |B−R| is equal to or larger than the color threshold value.

For example, as shown in FIG. 5, when the color threshold value, which is a threshold value for identifying a color mode of a pixel as color pixel, is 10, the CPU 71 determines whether at least one of the calculated brightness differences |R−G|, |G−B| and |B−R| is 10 or larger.

When it is determined that at least one of the calculated brightness differences |R−G|, |G−B| and |B−R| is equal to or larger than the color threshold value (S114: YES), the CPU 71 proceeds to S115. In S115, the CPU 71 determines that a color mode of the pixel is a color pixel mode indicating a pixel of a color, counts the pixel as a color pixel, i.e., adds 1 to the color pixel counter, ends the above sub-process and returns to S13 of the main flowchart.

On the other hand, when it is determined that all of the calculated brightness differences |R−G|, |G−B| and |B−R| are below the color threshold value (S114: NO), the CPU 71 proceeds to S116.

In S116, the CPU 71 reads out the black threshold value, which is a threshold value for identifying a color mode of a pixel as black pixel, from the pixel threshold value table 91 that is stored in the flash ROM 73. Subsequently, the CPU 71 reads out the RGB values of the target pixel to determine whether all values of R, G and B are the black threshold value or larger.

For example, as shown in FIG. 5, when the black threshold value, which is a threshold value for identifying a color mode of a pixel as black pixel, is 50, the CPU 71 reads out the RGB values of the target pixel, which are stored in the RAM 74 in S11 or S14, and determines whether all values of R, G and B are 50 or smaller.

When it is determined that all values of R, G and B of the target pixel are equal to or smaller than the black threshold (S116: YES), the CPU 71 proceeds to S117. In S117, the CPU 71 determines that a color mode of the pixel is the black pixel mode indicating a pixel of black. The CPU 71 counts the pixel as a black pixel, i.e., adds 1 to the black pixel counter. The CPU 71 ends the above sub-process and returns to S13 of the main flowchart.

On the other hand, when it is determined that at least one value of R, G and B of the target pixel is larger than the black threshold value (S116: NO), the CPU 71 proceeds to S118. In S118, the CPU 71 determines that a color mode of the pixel is the gray pixel mode indicating a pixel of gray. The CPU 71 counts the pixel as a gray pixel, i.e., adds 1 to the gray pixel counter. The CPU 71 ends the above sub-process and returns to S13 of the main flowchart.

[Page Color Mode Identifying Process]

Hereinafter, a sub-process of the page color mode identifying process, which is executed by the CPU 71 in S15, is described with reference to FIG. 9.

As shown in FIG. 9, in S211, the CPU 71 reads out and sums the respective count values of the background color pixel counter, the color pixel counter, the gray pixel counter and the black pixel counter. The CPU 71 stores the sum in the RAM 74, as the total number of pixels of the page. Alternatively, the total number of pixels of a page unit, which can be read out by the respective line sensors 41, 42, may be stored beforehand in the flash ROM 73 for each size of the sheet P, for example, A3, A4, A5 sizes.

In S212, the CPU 71 reads out the count value of the background color pixel counter and the total number of pixels from the RAM 74. The CPU 71 divides the count value of the background color pixel counter by the total number of pixels to calculate a background color pixel ratio. The CPU 71 stores the background color pixel ratio in the RAM 74.

Subsequently, in S213, the CPU 71 reads out the blank sheet threshold value, which is a page threshold value for identifying a color mode of the page as blank page, from the page threshold value table 92 that is stored in the flash ROM 73. Then, the CPU 71 reads out the background color pixel ratio of the page from the RAM 74 and determines whether the background color pixel ratio of the page is equal to or larger than the blank sheet threshold value.

For example, as shown in FIG. 6, when the blank sheet threshold value is 98%, the CPU 71 determines whether the background color pixel ratio of the page is 98% or larger.

When it is determined that the background color pixel ratio of the page is equal to or larger than the blank sheet threshold value (S213: YES), the CPU 71 proceeds to S214. In S214, the CPU 71 determines that the image data of the page is image data of a blank page. The CPU 71 adds header information, which indicates that the page is a color mode of the blank page, to a header of the image data. The CPU 71 stores the image data with the header information in the RAM 74. The CPU 71 converts the image data into monochrome data. The CPU 71 converts values of all pixels into 255 corresponding to white. The CPU 71 stores the values in the RAM 74. The CPU 71 ends the above sub-process and returns to S16 of the main flowchart.

On the other hand, when it is determined that the background color pixel ratio of the page is below the blank sheet threshold value (S213: NO), the CPU 71 proceeds to S215. In S215, the CPU 71 reads out the count value of the background color pixel counter and the total number of pixels from the RAM 74. The CPU 71 stores a value, which is obtained by subtracting the count value of the background color pixel counter from the total number of pixels, in the RAM 74, as a first subtraction total number of pixels. Then, the CPU 71 reads out the count value of the color pixel counter and the first subtraction total number of pixels from the RAM 74. The CPU 71 calculates a color pixel ratio by dividing the count value of the color pixel counter by the first subtraction total number of pixels. The CPU 71 stores the color pixel ratio in the RAM 74.

Subsequently, in S216, the CPU 71 reads out the color page threshold value, which is a page threshold value for identifying a color mode of the page as color page, from the page threshold value table 92 that is stored in the flash ROM 73. Then, the CPU 71 reads out the color pixel ratio of the page from the RAM 74 and determines whether the color pixel ratio of the page is equal to or larger than the color page threshold value.

For example, as shown in FIG. 6, when the color page threshold value, which is a page threshold value for identifying a color mode of a page as color page, is 2%, the CPU 71 reads out the color pixel ratio of the page from the RAM 74 and determines whether the color pixel ratio of the page is 2% or larger.

When it is determined that the color pixel ratio of the page is equal to or larger than the color page threshold value (S216: YES), the CPU 71 proceeds to S217. In S217, the CPU 71 determines that the image data of the target image of the page is image data of a color page. The CPU 71 adds header information, which indicates that the page is a color mode of a color page, to a header of the image data. The CPU 71 stores the image data with the header information in the RAM 74. The CPU 71 ends the above sub-process and returns to S16 of the main flowchart.

On the other hand, when it is determined that the color pixel ratio of the page is below the color page threshold value (S216: NO), the CPU 71 proceeds to S218. In S218, the CPU 71 reads out the count value of the color pixel counter and the first subtraction total number of pixels from the RAM 74. The CPU 71 stores a value, which is obtained by subtracting the count value of the color pixel counter from the first subtraction total number of pixels, in the RAM 74, as a second subtraction total number of pixels. Then, the CPU 71 reads out the count value of the gray pixel counter and the second subtraction total number of pixels from the RAM 74. The CPU 71 calculates a gray pixel ratio by dividing the count value of the gray pixel counter by the second subtraction total number of pixels, and stores the gray pixel ratio in the RAM 74.

Alternatively, in S218, the CPU 71 may read out the count value of the color pixel counter, the count value of the background color pixel counter and the total number of pixels from the RAM 74. The CPU 71 may store a value, which is obtained by subtracting the count value of the background color pixel counter and the count value of the color pixel counter from the total number of pixels, in the RAM 74, as the second subtraction total number of pixels.

Subsequently, in S219, the CPU 71 reads out the gray page threshold value, which is a page threshold value for identifying a color mode of the page as gray page, from the page threshold value table 92 that is stored in the flash ROM 73. Then, the CPU 71 reads out the gray pixel ratio of the page from the RAM 74 and determines whether the gray pixel ratio of the page is equal to or larger than the gray page threshold value.

For example, as shown in FIG. 6, when the gray page threshold value is 5%, the CPU 71 determines whether the gray pixel ratio of the page is 5% or larger.

When it is determined that the gray pixel ratio of the page is equal to or larger than the gray page threshold value (S219: YES), the CPU 71 proceeds to S220. In S220, the CPU 71 determines that the image data of the target image of the page is image data of a gray page. The CPU 71 adds header information, which indicates that the page is a color mode of the gray page, to a header of the image data. The CPU 71 stores the image data with the header information in the RAM 74.

Subsequently, in S221, the CPU 71 performs a gradation conversion of the predetermined number of gradations, for example, 256 gradations, for the image data, based on the RGB values of each pixel, to convert the image data into image data of a gradation image. The CPU 71 stores the converted image data in the RAM 74, ends the above sub-process and returns to S16 of the main flowchart.

On the other hand, when it is determined that the gray pixel ratio of the page is below the gray page threshold value (S219:

NO), the CPU 71 proceeds to S222. In S222, the CPU 71 determines that the image data of the target image of the page is image data of a black-and-white page. The CPU 71 adds header information, which indicates that the page is a color mode of a black-and-white page, to a header of the image data. The CPU 71 stores the image data with the header in the RAM 74.

Then, in S223, the CPU 71 converts the image data into image data of a black-and-white image by performing a RGB averaging process and the like for the RGB values of each pixel. The CPU 71 stores the image data in the RAM 74, ends the above sub-process and returns to S16 of the main flowchart.

Hereinafter, an example in which the color mode identifying process has been performed for the sheet P having a color photograph printed thereon is described with reference to FIGS. 6 and 10 to 12.

Figure 10:
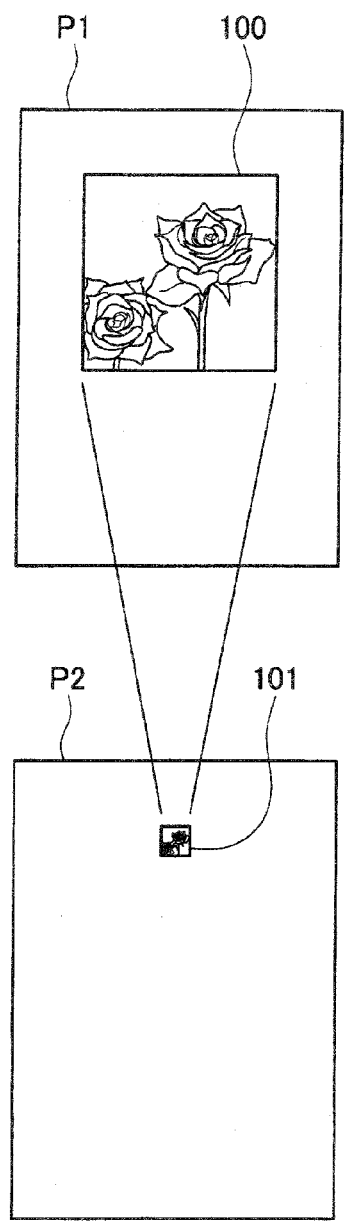
FIG. 10 shows an example of a sheet on which a color photograph is printed.

As shown in an upper portion of FIG. 10, a color photograph 100 of a rose is printed on the sheet P1. In addition, as shown in a lower portion of FIG. 10, a color photograph 101, which is obtained by reducing the color photograph 100 of a rose of the sheet P1, is printed on the sheet P2. Meanwhile, the sheet P1 and the sheet P2 have the same sheet size.

When the sheet P1 is scanned by the image scanning apparatus 1, the number of pixels for each color mode, which is counted in the process of S12, is as shown in FIGS. 10 and 11. That is, the number of background color pixels is 70000, the number of color pixels is 15000, the number of gray pixels is 5000 and the number of black pixels is 1000.

In addition, when the sheet P2 is scanned by the image scanning apparatus 1, the number of pixels for each color mode, which is counted in the process of S12, is as shown in FIGS. 10 and 12. That is, the number of background color pixels is 97000, the number of color pixels is 1500, the number of gray pixels is 500 and the number of black pixels is 1000.

Accordingly, as shown in FIG. 11, the total number of pixels of the image data of the sheet P1, which is calculated in the process of S15, is 100000 and the background color pixel ratio is 70%. In addition, the first subtraction total number of pixels, which is obtained by subtracting the number of background color pixels from the total number of pixels, is 30000 and the color pixel ratio is 50%. In addition, the second subtraction total number of pixels, which is obtained by subtracting the number of color pixels from the first subtraction total number of pixels, is 15000 and the gray pixel ratio is 16.7%.

In addition, as shown in FIG. 12, the total number of pixels of the image data of the sheet P2, which is calculated in the process of S15, is 100000 and the background color pixel ratio is 97%. Also, the first subtraction total number of pixels, which is obtained by subtracting the number of background color pixels from the total number of pixels, is 3000 and the color pixel ratio is 50%. Further, the second subtraction total number of pixels, which is obtained by subtracting the number of color pixels from the first subtraction total number of pixels, is 1500 and the gray pixel ratio is 16.7%.

Thereby, as shown in FIG. 6, when the blank sheet threshold value is 98% and the color page threshold value is 2%, the respective background color pixel ratios of the sheet P1 and the sheet P2 are below the blank sheet threshold value and the respective color pixel ratios of the sheet P1 and the sheet P2 are both 50% and are equal to or larger than the color page threshold value. Therefore, the CPU 71 determines that the image data of the respective sheets P1 and P2 is image data of a color page and thus obtains the same determination result for the respective sheets P1 and P2 in the process of S15. In addition, even when the color pixel ratios and gray pixel ratios of the target images of the respective sheets P1 and P2 are the same, i.e., the target image is an image obtained by reducing the same image, the same color mode determination result can be obtained.

As described above, in the image scanning apparatus 1 of this illustrative embodiment, the CPU 71 counts the number of pixels of the image data in a page unit for each color mode of each pixel and obtains the total number of pixels of the image data in a page unit. In addition, the CPU 71 selects the number of pixels for each color mode of each page in order of background color pixel, color pixel and gray pixel. When the background color pixel ratio, which is obtained by dividing the number of background color pixels, which is first selected, by the total number of pixels, is equal to or larger than the blank sheet threshold value, the CPU determines that the page is a blank page.

When it is determined that the page is not a blank page, when the color pixel ratio, which is obtained by dividing the number of color pixels by the first subtraction total number of pixels obtained by subtracting the number of background color pixels, which is first selected, from the total number of pixels, is equal to or larger the color page threshold value, the CPU 71 determines that the page is a color page. In case that it is determined that the page is not a color page, when the gray pixel ratio, which is obtained by dividing the number of gray pixels by the second subtraction total number of pixels obtained by subtracting the number of color pixels, which is secondarily selected, from the first subtraction total number of pixels, is equal to or larger than the gray page threshold value, the CPU 71 determines that the page is a gray page. Furthermore, when it is determined that the page is not a gray page, the CPU 71 determines that the page is a black-and-white page.

Thereby, since the first subtraction total number of pixels is a value obtained by subtracting the number of background color pixels from the total number of pixels and the second subtraction total number of pixels is a value obtained by subtracting the number of color pixels, which is used in the second page color mode determination, from the first subtraction total number of pixels, it is possible to regard the color pixel ratio and the gray pixel ratio as the pixel ratios of the respective color modes of the target image. Accordingly, when the pixel ratios of the respective color modes of the target image are the same in a page unit, it is possible to reliably make the determination results of the color modes of the target image same. For example, even when the target image is reduced in a page unit, it is possible to reliably make the determination results of the color modes of the target image same.

Further, when identifying the color mode of the target image of the page, it is possible to rapidly determine whether the page is a blank page by first selecting the number of pixels of the background color pixel mode, which is a background color of a sheet. In addition, when identifying the color mode of the target image of the page, by selecting the number of background color pixels first, the number of color pixels and the number of gray pixels can be reliably selected thereafter, so that it is possible to reliably obtain the pixel ratios with respect to the first subtraction total number of pixels and the second subtraction total number of pixels.

Further, when identifying the color mode of the target image of the page, the color pixel ratio is calculated secondly, so that it is possible to rapidly determine whether the image data is image data of a color page for each page. Also, when identifying the color mode of the target image of the page, the gray pixel ratio is thirdly calculated, so that it is possible to quickly determine whether the image data is image data of a gray page or black-and-white pate for each page.

The invention is not limited to the above illustrative embodiment and can be can variously modified and changed without departing from the scope of the invention. For example, the invention can be modified in the following way:

(A) For example, in the illustrative embodiment, the CPU 71 executes the processes of S11 to S16 in accordance with the program stored in the flash ROM 73. However, the CPU 71 may output the image data to the PC 81 or server, which is not shown, connected via a network, which is not shown, through the communication interface 75. The PC 81 or server, which is not shown, may execute the processes of S11 to S16.

(B) For example, the program shown by the flowcharts of FIGS. 7 to 9 and the various parameters stored in the pixel threshold value table 91 or page threshold value table 92 may be stored in a portable storage medium, for example, an SD memory card, having a flash memory mounted thereto. For example, the program and the various parameters may be stored in a storage medium such as CD-ROM and DVD-ROM. The CPU 71 may read out the programs and the like, which are stored in the portable storage medium or the storage medium such as CD-ROM and DVD-ROM, through a data read unit, which is not shown, and store the same in the flash ROM 73.

(C) For example, in S214 of the illustrative embodiment, the CPU converts the image data of the page, which is determined as a blank sheet, into monochrome data and all data into a white page. However, the CPU may delete the data of the page that is determined as a blank sheet.

(D) For example, in S111 of the illustrative embodiment, the CPU determines whether all the RGB values are equal to or larger than the threshold value. However, the invention is not limited thereto. For example, the CPU may set a color of a head line of a sheet as a background color and count, as a background color pixel, pixels having RGB values close to RGB values of the background color. In addition, the CPU may examine frequencies of colors that are used in all data of a page and set a color having the highest frequency as a background color. By providing such a background color determination unit that determines a background color of a sheet, it is possible to determine a unicolor and solid color page as a blank page by using only the background color.

(E) For example, in S111 of the illustrative embodiment, the CPU determines whether all the RGB values are equal to or larger than the background color threshold value. However, the CPU may determine whether each of the RGB values is close to a predetermined value.

(F) For example, in the illustrative embodiment, the process is performed using the color space of the RGB color system. However, the invention is not limited to the process in the color space. For example, a CMY color system or a XYZ color system can also be used.

(G) For example, in the illustrative embodiment, the pixel color mode identifying process is performed in the order of background color, color, black and gray. In addition, the page color mode identifying process is performed in the order of background color, color, gray and black. However, the invention is not limited thereto, and the pixel color mode identifying process and the page color mode identifying process may be performed in an arbitrary order.

What is claimed is:

1. An image processing apparatus comprising:
an identifying unit that identifies a color mode of each pixel included in image data of a target image, based on color data of each pixel included in the image data;
a counting unit that counts, for each color mode of the pixels, a number of pixels which are included in the image data in a page unit and are identified by the identifying unit as the color mode;
an acquiring unit that acquires a total number of pixels included in the image data in a page unit;
a determining unit that determines which color mode the target image corresponds to in a page unit, the determination being performed sequentially for each color mode based on a predetermined color mode order; and
a subtracting unit that calculates a subtraction total number of pixels obtained by subtracting a summed number of pixels, which is obtained by summing the number of pixels of each color mode before a second or subsequent color mode in the predetermined color mode order, from the total number of pixels acquired by the acquiring unit, before a determination to the second or subsequent color mode in the predetermined color mode order is performed by the determining unit,
wherein the determining unit determines whether the target image corresponds to a first color mode in the predetermined color mode order, based on a pixel ratio of a number of pixels identified as the first color mode to the total number of pixels, and
wherein the determining unit determines whether the target image corresponds to the second or subsequent color mode in the predetermined color mode order, based on a pixel ratio of a number of pixels identified as the second or subsequent color mode to the subtraction total number of pixels calculated by the subtracting unit.

2. The image processing apparatus according to claim 1, wherein the color mode of each pixel includes a background color pixel mode indicating that each pixel is a background color,
wherein the first color mode in the predetermined color mode order is the background color pixel mode, and
wherein the determining unit determines that the image data is image data of a blank page when a pixel ratio of the number of pixels of the background color pixel mode to the total number of pixels is equal to or larger than a blank page threshold value.

3. The image processing apparatus according to claim 2, wherein the determination of the second color mode is performed when the determining unit determines that the pixel ratio of the number of pixels of the background color pixel mode to the total number of pixels is smaller than a blank page threshold value.

4. The image processing apparatus according to claim 1, wherein the color mode of each pixel includes a color pixel mode indicating that each pixel is color,
wherein the second color mode in the predetermined color mode order is the color pixel mode, and
wherein the determining unit determines that the image data is image data of a color page when a pixel ratio of the number of pixels of the color pixel mode to the subtraction total number of pixels is equal to or larger than a color page threshold value.

5. The image processing apparatus according to claim 4, wherein a determination of a third color mode is performed when the determining unit determines that the pixel ratio of the number of pixels of the color pixel mode to the subtraction total number of pixels is smaller than a color page threshold value.

6. The image processing apparatus according to claim 1, wherein the color mode of each pixel includes a gray pixel mode indicating that each pixel is gray, wherein a third color mode in the predetermined color mode order is the gray pixel mode, wherein the determining unit determines that the image data is image data of a gray page when a pixel ratio of the number of pixels of the gray pixel mode to the subtraction total number of pixels is equal to or larger than a gray page threshold value.

7. The image processing apparatus according to claim 6, wherein the determining unit determines that the image data is image data of a black-and-white page when the pixel ratio of the number of pixels of the gray pixel mode to the subtraction total number of pixels is smaller than the gray page threshold value.

8. An image scanning apparatus comprising:

an image scanning unit that scans an image of a sheet, and the image processing apparatus according to claim 1, which performs image processing to the image scanned by the image scanning unit.

9. An image processing method comprising:

identifying, using a processor comprising hardware, a color mode of each pixel included in image data of a target image, based on color data of each pixel included in the image data;

counting, for each color mode of the pixels, a number of pixels included in the identified image data for each color mode of each pixel;

acquiring a total number of pixels included in the image data in a page unit;

determining, using the processor, which color mode the target image corresponds to, in a page unit, the determining being performed sequentially for each color mode based on a predetermined color mode order; and calculating a subtraction total number of pixels obtained by subtracting a summed number of pixels, which is obtained by summing the number of pixels of each color mode before a second or subsequent color mode in the predetermined color mode order, from the total number of pixels acquired, before a determination to the second or subsequent color mode in the predetermined color mode order is performed, wherein, determining whether the target mode corresponds to a first color mode in the predetermined color mode order is performed based on a pixel ratio of a number of pixels identified as the first color mode to the total number of pixels, and determining whether the target mode corresponds to the second or subsequent color mode in the predetermined color mode order is performed based on a pixel ratio of a number of pixels identified as the second or subsequent color mode order to the subtraction total number of pixels calculated by the subtracting unit.

10. An image processing apparatus comprising:

an identifying unit that identifies a color mode, which includes a first color mode and a second color mode, of each pixel included in image data of a target image, based on color data of each pixel included in the image data;

a counting unit that counts a number of pixels included in the image data for each color mode identified by the identifying unit so as to obtain a total number of pixels for each color mode, in a page unit;

an acquiring unit that acquires a total number of pixels included in the image data in a page unit;

a first determining unit that compares a pixel ratio of a total number of pixels of the first color mode to the total number of pixels acquired by the acquiring unit with a first threshold value, and determines that the target image corresponds to the first color mode if the pixel ratio is equal to or larger than the first threshold value;

a subtracting unit that calculates a subtraction total number of pixels obtained by subtracting the total number of pixels of the first color mode from the total number of pixels acquired by the acquiring unit; and a second determining unit that compares a pixel ratio of a total number of pixels of the second color mode to the subtraction total number of pixels with a second threshold value, and determines that the target image corresponds to the second color mode if the pixel ratio is equal to or larger than the second threshold value.

* * * * *